(12) United States Patent
Tao

(10) Patent No.: US 10,563,685 B2
(45) Date of Patent: Feb. 18, 2020

(54) DOUBLE-ADHESIVE-TAPE SPIKED-FOOT STAPLE

(71) Applicant: CAH, INC, Las Vegas, NV (US)

(72) Inventor: Guomin Tao, Shaoxing (CN)

(73) Assignee: CAH, INC, Las Vegas, NV (US)

( * ) Notice: Subject to any disclaimer, the term of this patent is extended or adjusted under 35 U.S.C. 154(b) by 139 days.

(21) Appl. No.: 15/818,658

(22) Filed: Nov. 20, 2017

(65) Prior Publication Data

US 2019/0154071 A1 May 23, 2019

(51) Int. Cl.
*F16B 15/08* (2006.01)
*F16B 15/00* (2006.01)

(52) U.S. Cl.
CPC .......... *F16B 15/08* (2013.01); *F16B 15/0015* (2013.01)

(58) Field of Classification Search
CPC ...... F16B 15/0015; F16B 15/08; F16B 27/00; Y10S 411/92
USPC .................................................. 411/442, 443
See application file for complete search history.

(56) References Cited

U.S. PATENT DOCUMENTS

| | | | | |
|---|---|---|---|---|
| 1,026,050 | A * | 5/1912 | Reber | B65D 71/00 206/340 |
| 2,122,814 | A * | 7/1938 | Hansen | F16B 15/08 206/340 |
| 3,076,373 | A * | 2/1963 | Matthews | F16B 15/0092 174/159 |
| 3,170,279 | A * | 2/1965 | Dubini | B21D 53/36 411/442 |
| 3,605,402 | A * | 9/1971 | Larson | B21F 45/24 59/77 |
| 3,813,985 | A * | 6/1974 | Perkins | F16B 15/00 411/442 |
| 5,441,373 | A * | 8/1995 | Kish | F16B 15/0092 411/258 |
| 5,620,289 | A * | 4/1997 | Curry | F16B 1/0071 411/444 |
| 7,845,888 | B2 * | 12/2010 | Lat | F16B 15/08 411/442 |
| 9,121,427 | B2 * | 9/2015 | Young | F16B 15/0015 |
| 2007/0031627 | A1* | 2/2007 | Sato | F16B 15/0015 428/43 |
| 2009/0191023 | A1* | 7/2009 | Chang | F16B 15/08 411/443 |

* cited by examiner

*Primary Examiner* — Roberta S Delisle
(74) *Attorney, Agent, or Firm* — Maschoff Brennan

(57) ABSTRACT

A staple may include one staple top and two staple shoulders connected to the staple top. The staple may also include a spiked foot connected to each of the two staple shoulders. The staple may also include adhesive tapes arranged on surfaces of the staple shoulders.

8 Claims, 2 Drawing Sheets

DOUBLE-ADHESIVE-TAPE SPIKED-FOOT STAPLE

FIELD

The application relates generally to staples.

BACKGROUND

Nails may interact with an object to apply adhesive force. The staples may be implemented in a staple gun or staple dispenser to thereby interact with the object and apply the adhesive force. Prior to implementation in the staple gun or the staple dispenser, the staples may be bonded together by glue. Some applications of the glue may result in a weak bond between the staples and/or damage to the staple gun or the staple dispenser.

The subject matter claimed herein is not limited to embodiments that solve any disadvantages or that operate only in environments such as those described above. Rather, this background is only provided to illustrate one example technology area where some embodiments described herein may be practiced.

SUMMARY

Embodiments of the disclosure include a staple. The staple may include one staple top and two staple shoulders connected to the staple top. The staple may also include a spiked foot connected to each of the two staple shoulders, where the spiked feet of the two staple shoulders are arranged in a mirror-imaged manner. The staple may also include adhesive tapes arranged on surfaces of the staple shoulders.

BRIEF DESCRIPTION OF THE DRAWINGS

Example embodiments will be described and explained with additional specificity and detail through the use of the accompanying drawings in which.

DESCRIPTION OF EMBODIMENTS

Embodiments of the disclosure discuss a double-adhesive-tape spiked-foot staple. The staple can be bonded by adhesive tapes on staple shoulders in addition to glue bonding. The adhesiveness between staples may thereby be enhanced and a staple gun may not be damaged. The double-adhesive-tape spiked-foot staple may be suitable for use as a spiked-foot staple which may have a wider staple top and functions with two staples used together.

Figure 1:
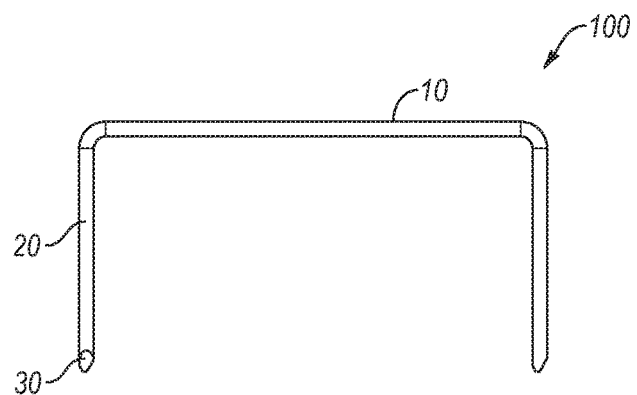
FIG. 1 illustrates an example double-adhesive-tape spiked-foot staple.
Figure 2:
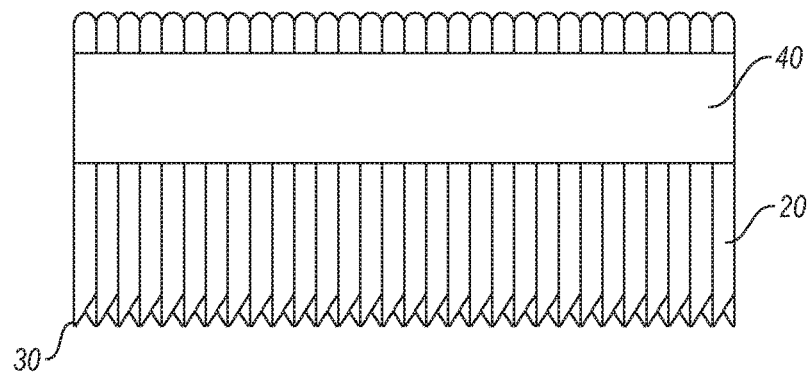
FIG. 2 illustrates an environment that includes the example double-adhesive-tape spiked-foot staple of FIG. 1 in a bonded row of multiple example double-adhesive-tape spiked-foot staples.
Figure 3:
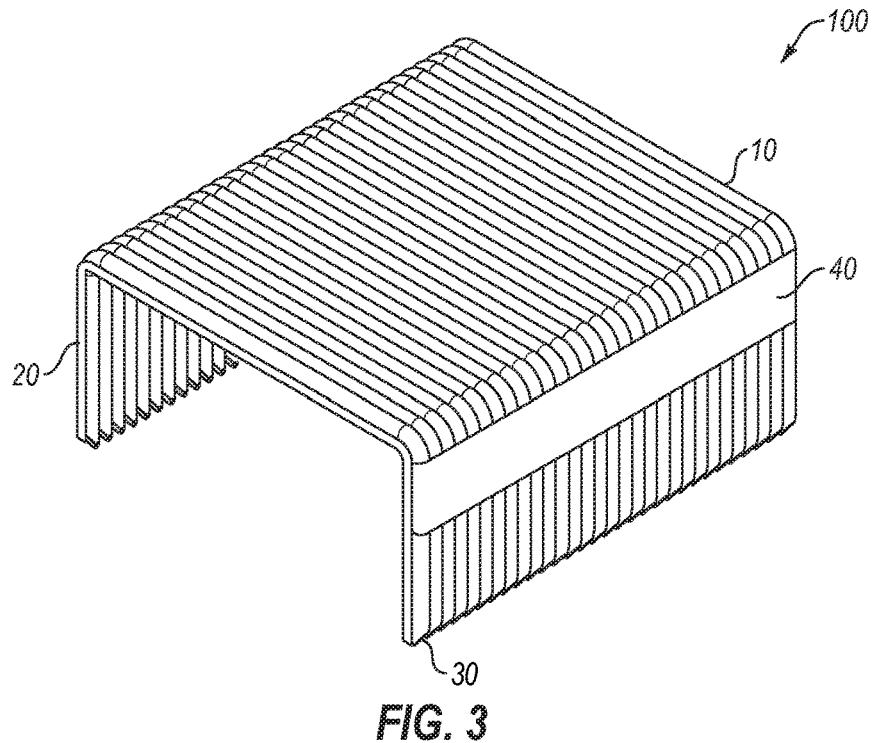
FIG. 3 illustrates a perspective view of a first side of the environment of FIG. 2 that includes the example double-adhesive-tape spiked-foot staple of FIG. 1 in the bonded row of multiple example double-adhesive-tape spiked-foot staples.
Figure 4:
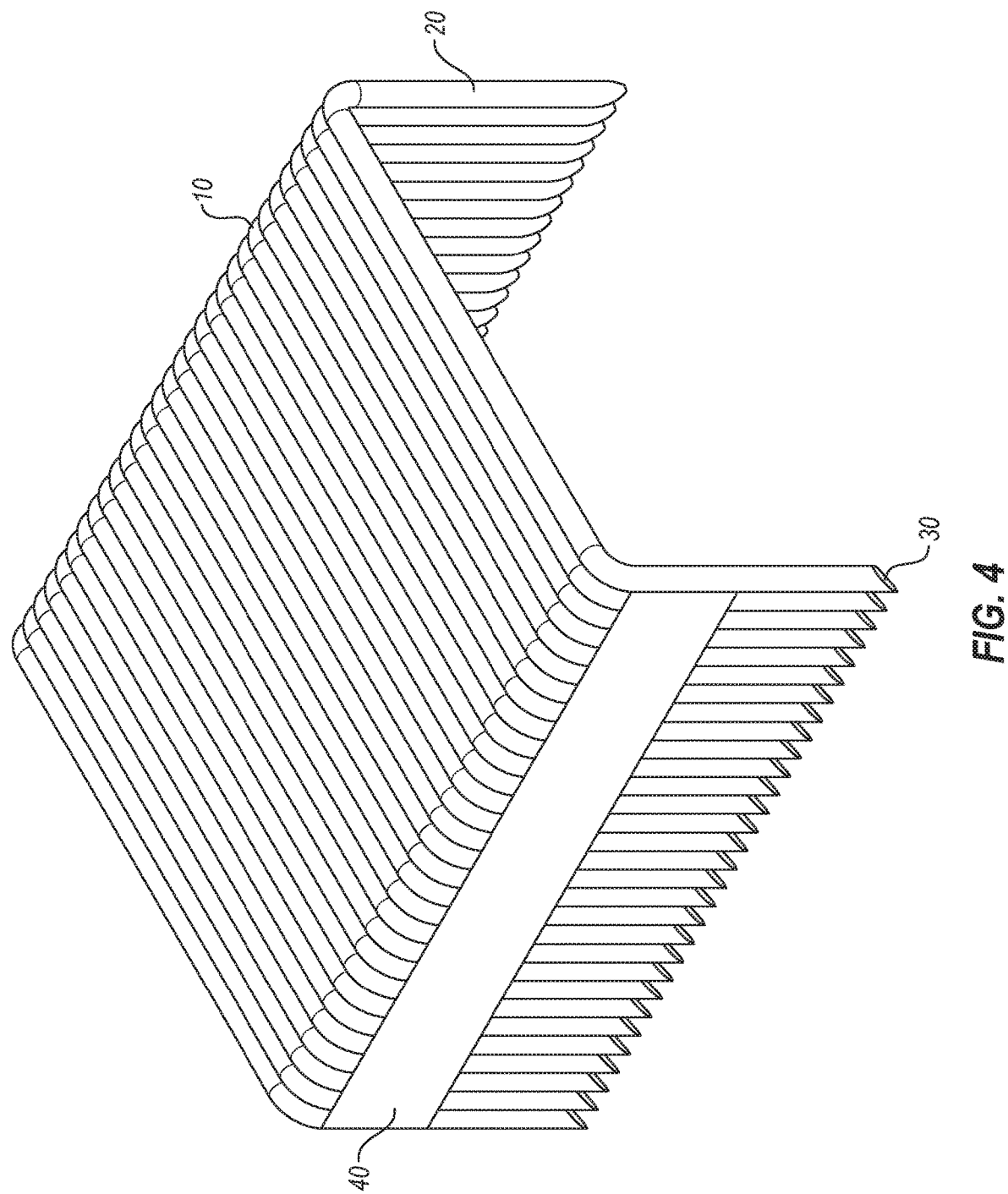
FIG. 4 illustrates another perspective view, including a second side of the environment of FIG. 2 that includes the example double-adhesive-tape spiked-foot staple of FIG. 1 in the bonded row of multiple example double-adhesive-tape spiked-foot staples.

Turning to the figures, FIGS. 1-4 illustrate an example double-adhesive-tape spiked-foot staple 100 that may include a staple top 10 and two staple shoulders 20. The example double-adhesive-tape spiked-foot staple 100 may be arranged in accordance with at least one embodiment described in the present disclosure. In some embodiments, the staple top 10 may be connected to the staple shoulders 20 at a first end of each respective staple shoulder 20. Additionally or alternatively, each of the staple shoulders 20 may be connected with a spiked foot 30 at a second end of each respective staple shoulder 20. In these or other embodiments, the spiked feet 30 of the staple shoulders 20 may be arranged in a mirror imaging manner. For example, each of the spiked feet 30 may be inverted or flipped relative to the other. Additionally or alternatively, the adhesive tapes 40 may be arranged on surfaces of the staple shoulders 20, and the adhesive tapes 40 may have a length of about 6 mm and a width of about 0.06 mm. In these or other embodiments, the staple may have an outer diameter of about 26 mm or 27 mm (such as 26.2-26.651 mm) and an inner diameter of about 23 or 24 mm (such as 23.6±0.2 mm), referencing a center of each of the staple shoulders 20 as the center of a circle. In some embodiments, between about 60 and 70 staples (such as 68 staples) may be arranged in each row of staples, and a stapleing strip may have a length of about 105 mm or 109 mm (such as 106.8±1.36 mm).

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner. Additionally, any terms such as "substantially" or "about" may mean a value within 10% of the approximated value.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A staple assembly comprising:
   a first staple and a second staple bonded together with glue, wherein each of the first staple and the second staple includes:
   a flat staple top;
   two staple shoulders connected to the staple top wherein each staple shoulder of the two staple shoulders includes a first end connected to respective ends of the flat staple top, the two staple shoulders positioned parallel relative to each other and positioned perpendicular to the flat staple top; and
   a spiked foot connected to each of the two staple shoulders, the spiked feet of the two staple shoulders being arranged in a mirror-imaged manner; and
   adhesive tapes arranged on surfaces of the staple shoulders of the first staple and the second staple such that the adhesive tapes provide extra bonding between the first staple and the second staple in addition to the bonding provided by the glue.

2. The staple assembly of claim 1, further comprising a row of staples bonded together with glue, wherein the adhesive tapes provide extra bonding of the row of staples in addition to the bonding provided by the glue.

3. The staple assembly of claim 2, wherein the row of staples includes between sixty-five staples and seventy staples.

4. The staple assembly of claim 3, wherein the row of staples consists of 68 staples.

5. The staple assembly of claim 2, wherein the adhesive tapes include a length of about six millimeters and a width of about 0.06 millimeters.

6. The staple assembly of claim 1, wherein the first staple and the second staple each include an inner diameter equal to or between 23.4 millimeters and 23.8 millimeters.

7. The staple assembly of claim 1, wherein the first staple and the second staple each include an outer diameter equal to or between 26.2 millimeters and 26.651 millimeters.

8. The staple assembly of claim 1, wherein the spiked feet are connected to the staple shoulders at a second end of each staple shoulder opposite the first end of each staple shoulder.

\* \* \* \* \*